United States Patent [19]
Horikoshi

[11] Patent Number: 5,971,519
[45] Date of Patent: Oct. 26, 1999

[54] IMAGE FORMING APPARATUS AND IMAGE FORMING METHOD, WHICH SELECT THE APPROPRIATE RECORDING MEDIUM CORRESPONDING TO THE IMAGE TO PRINT ON IT

[75] Inventor: Jun Horikoshi, Yokohama, Japan

[73] Assignee: Canon Kabushiki Kaisha, Tokyo, Japan

[21] Appl. No.: 08/772,866

[22] Filed: Dec. 26, 1996

Related U.S. Application Data

[63] Continuation of application No. 08/233,399, Apr. 26, 1994, abandoned.

[30] Foreign Application Priority Data

Apr. 28, 1993 [JP] Japan ................................. 5-101679
Apr. 20, 1994 [JP] Japan ................................. 6-082047

[51] Int. Cl.⁶ ................................................. B41J 2/205
[52] U.S. Cl. ........................ 347/16; 271/9.05; 358/298; 399/45; 347/104
[58] Field of Search .............................. 347/16, 104, 15, 347/218; 399/45; 358/298, 296, 504, 534, 462; 271/9.05; 400/605

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,475,128 | 10/1984 | Koumura ................................ 358/296 |
| 4,521,805 | 6/1985 | Ayata ..................................... 347/3 X |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,847,658 | 7/1989 | Takebe .................................. 355/311 X |
| 4,899,171 | 2/1990 | Ogura .................................... 400/605 X |
| 4,900,173 | 2/1990 | Okamura .............................. 347/104 X |
| 4,937,592 | 6/1990 | Akoa .................................... 346/134 X |
| 5,130,757 | 7/1992 | Ito ............................................. 355/311 |
| 5,282,001 | 1/1994 | Watson ................................ 355/311 X |
| 5,459,580 | 10/1995 | Suzuki ................................. 358/296 X |
| 5,680,226 | 10/1997 | Takayanagi ............................. 358/462 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—Joseph Hartary
*Attorney, Agent, or Firm*—Fitzpatrick, Cella, Harper & Scinto

[57] ABSTRACT

To assure that a plain paper or an exclusively usable paper is selected as a recording medium depending on requested image such as a full color image or a monochromatic image, the image forming apparatus includes an image forming unit for forming an image on a recording medium, a plain paper feeding unit, an exclusively usable paper feeding unit, a selecting unit for selecting a recording medium corresponding to a quality of image to be recorded, and a selected paper feeding unit as essential components. An image forming method to be practiced by operating the image forming apparatus includes the steps of selecting a recording medium to be used corresponding to a quality of an image to be printed, feeding the selected paper, and forming the image on the recording medium.

69 Claims, 10 Drawing Sheets

BOTTOM PLAN VIEW

IMAGE FORMING APPARATUS AND IMAGE FORMING METHOD, WHICH SELECT THE APPROPRIATE RECORDING MEDIUM CORRESPONDING TO THE IMAGE TO PRINT ON IT

This application is a continuation of application Ser. No. 08/233,399 filed Apr. 26, 1994, now abandoned.

BACKGROUND OF THE INVENTION

1. Field of the Invention

The present invention relates to an image forming apparatus for forming a monochromatic image or a full color image by employing, for example, an ink jet recording process, a thermal transferring process or an electronic photographing process. Further, the present invention relates to an image forming method to be practiced by the image forming apparatus.

2. Description of the Related Art

In recent years, many kinds of image forming apparatuses which form an image on a recording medium by employing an ink jet recording process, a thermal transferring process or an electronic photographing process have been developed.

Among the above-mentioned recording processes, the ink jet recording process is a so-called non-impact type recording process which makes it possible to form an image on various kinds of recording medium such as plain paper or the like by ejecting ink onto the recording medium so as to allow the ejected ink to adhere to the recording medium. However, in the case that a full color image is formed on the recording medium using plural inks of different colors, a large quantity of inks are unavoidably shot onto the recording medium. For this reason, there arise malfunctions that extra ink flows between adjacent dots on the surface of the recording medium depending on properties of the recording medium. Moreover, ink oozing appears on the recording medium resulting in degraded image.

Also in the case that a monochromatic image is formed on a recording medium, if a large area of the recording medium is fully coated with ink or if a photographic image is formed on the recording medium, a large quantity of ink is shot onto the recording medium compared with the case that characters or line-shaped figures are formed on the recording medium. This results in the same or similar malfunctions.

To form excellent images on a recording medium by an ink jet recording apparatus, it is desirable to employ exclusively usable papers (hereinafter referred to as EU papers) which are coated with an ink absorbing layer and a color appearance layer. Incidentally, EU paper is usually prepared in the form of a coated paper. Also in the case that a halftone image such as a photograph assuring a high quality of image is to be formed on a recording medium by the thermal transferring process, it is desirable to employ an EU paper having excellent surface flatness to improve a property of color appearance.

To form a halftone image having a high quality on a recording medium by the electronic photographing process, it is also desirable to employ an EU paper having an excellent surface flatness.

In practice, however, a user selects the recording medium to be used at his discretion. After the selection, image is formed on the recording mediums selected by the user.

SUMMARY OF THE INVENTION

A quality image can be formed on a recording medium irrespective of the type of a recording process when an EU paper for the recording process is practically used as a recording medium. However, a problem is that an EU paper is more expensive than a plain paper.

The present invention has been made in consideration of the foregoing problem to be solved.

An object of the present invention is to provide an image forming apparatus and an image forming method wherein a recording medium can be selected corresponding to a quality of image to be formed.

Anther object of the present invention is to provide an image forming apparatus and an image forming method wherein a running cost of the image forming apparatus can be reduced by employing an EU paper only when it is necessary but employing a plain paper on the other occasions.

The deterioration of halftone image formed on a plain paper is conspicuous but the deterioration of image to represent characters, line-shaped figures or the like formed on the plain paper is not conspicuous. Especially, when an ink jet recording process is employed, the deterioration of image to represent characters, line-shaped figures or the like formed on a plain paper is not a serious problem, because a small quantity of ink is shot onto the plain paper. While in the case that a strict request is raised for assuring a quality image representing a photograph or the like to be formed on a recording medium, no strict request is usually raised with respect to the image to represent characters, line-shaped figures or the like. Some EU paper has poorer writability than plain papers for writing with a pencil or a similar writing tool. However, in the case that characters or the like are formed on a recording medium, there often arises a necessity for writing additionally on it. When images representing characters or the like are formed on a recording medium, a plain paper is sometimes required to be used as a recording medium.

In the circumstances as mentioned above, another object of the present invention is to provide an image forming apparatus and an image forming method wherein halftone images can be formed on an EU paper, and images representing characters, line-shaped figures or the like can be formed on a plain paper.

A further object of the present invention is to provide an image forming apparatus and an image forming method wherein an image requiring a large quantity of ink can be formed on an EU paper, and moreover, an image requiring a small quantity of ink can be formed on a plain paper.

In recent years, recycled paper is used as a recording medium to protect an environment from damage.

In the view of the foregoing fact, another object of the present invention is to provide an image forming apparatus and an image forming method wherein an image having no strict request for quality image can be formed on a recycled paper.

According to a first aspect of the present invention, there is provided an image forming apparatus comprising:

image forming means for forming an image on a recording medium, plain paper feeding means for feeding a plain paper to the image forming means as the recording medium, exclusively usable paper feeding means for feeding an exclusively usable paper suitable for forming an image with the image forming means to the image forming means as the recording medium, selecting means for selecting a recording medium to be used corresponding to a quality of the image to be recorded thereon, and selected paper feeding means for feeding a recording medium to the image forming means with the aid of the plain paper feeding means or the exclusively usable paper feeding means corresponding to the selected kind of the recording medium.

According to a second aspect of the present invention, there is provided an image forming apparatus comprising:

image forming means for forming an image on a recording medium, a plurality of storing means for storing each of plural kinds of recording mediums, detecting means for detecting the kind of recording medium stored in each of the storing means, conveying means for conveying each of the plural kinds of recording mediums stored in the plurality of storing means to the image forming means, selecting means for selecting each recording medium corresponding to a quality of image to be formed, and controlling means for detecting the storing means storing recording mediums selected by the selecting means, and conveying the selected recording mediums from the storing means to the image forming means.

According to a third aspect of the present invention, there is provided an image forming apparatus including image forming means for forming an image on a recording medium, plain paper feeding means for feeding a plain paper to the image forming means as the recording medium, and exclusively usable paper feeding means for feeding an exclusively usable paper suitable for forming an image on the exclusively usable paper with the image forming means to the image forming means as the recording medium, comprising:

a selecting step of selecting a recording medium to be used corresponding to a quality of the image to be formed on each recording medium, a selected paper feeding step of feeding the recording medium to the image forming means corresponding to the selected kind of recording medium with the aid of the plain paper feeding means or the exclusively usable feeding means; and an image forming step of forming an image on the recording medium.

According to a fourth aspect of the present invention, there is provided an image forming apparatus including a plurality of storing means each storing each of plural kinds of recording mediums, image forming means for forming an image on each recording medium, and conveying means for conveying each of the recording mediums stored in the plurality of storing means to the image forming means, comprising:

a detecting step of detecting the kind of recording medium stored in each of the plurality of storing means, a selecting step of selecting a recording medium corresponding to a quality of image to be formed, and a controlling step of detecting storing means having a recording medium selected in the selecting step received from among the plurality of receiving means and conveying each recording medium stored in each of the plurality of storing means to the image forming means with the aid of the conveying means.

As is apparent from the above description, according to the present invention, the image forming apparatus includes as essential components plain paper feeding means for feeding a plain paper to the image forming section as a recording medium and EU paper feeding means for feeding an EU paper suitable for forming an image colored with plural kinds of recording materials to the image forming section as a recording medium. The recording medium is selected corresponding to the quality of the image to be formed. With such construction, an image having no strict request for the quality, e. g., a character or the like is formed on an inexpensive plain paper, while an image having a strict request for quality such as a photograph or the like is formed on an expensive EU paper.

In addition, according to the present invention, adapted to an ink jet recording apparatus, an image requiring a large quantity of ink is formed on an EU paper to exhibit an excellent color appearance property, while an image requiring a small quantity of ink is formed on a plain paper. Consequently, a running cost of the ink jet recording apparatus can be reduced while assuring that a quality image is formed on the recording medium.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DETAILED DESCRIPTION OF THE PREFERRED EMBODIMENTS

The present invention will now be described in detail hereinafter with reference to the accompanying drawings which illustrate several preferred embodiments.

(Embodiment 1)

It should be noted that description is made with respect to an ink jet recording apparatus to which the present invention is applied.

Figure 1:
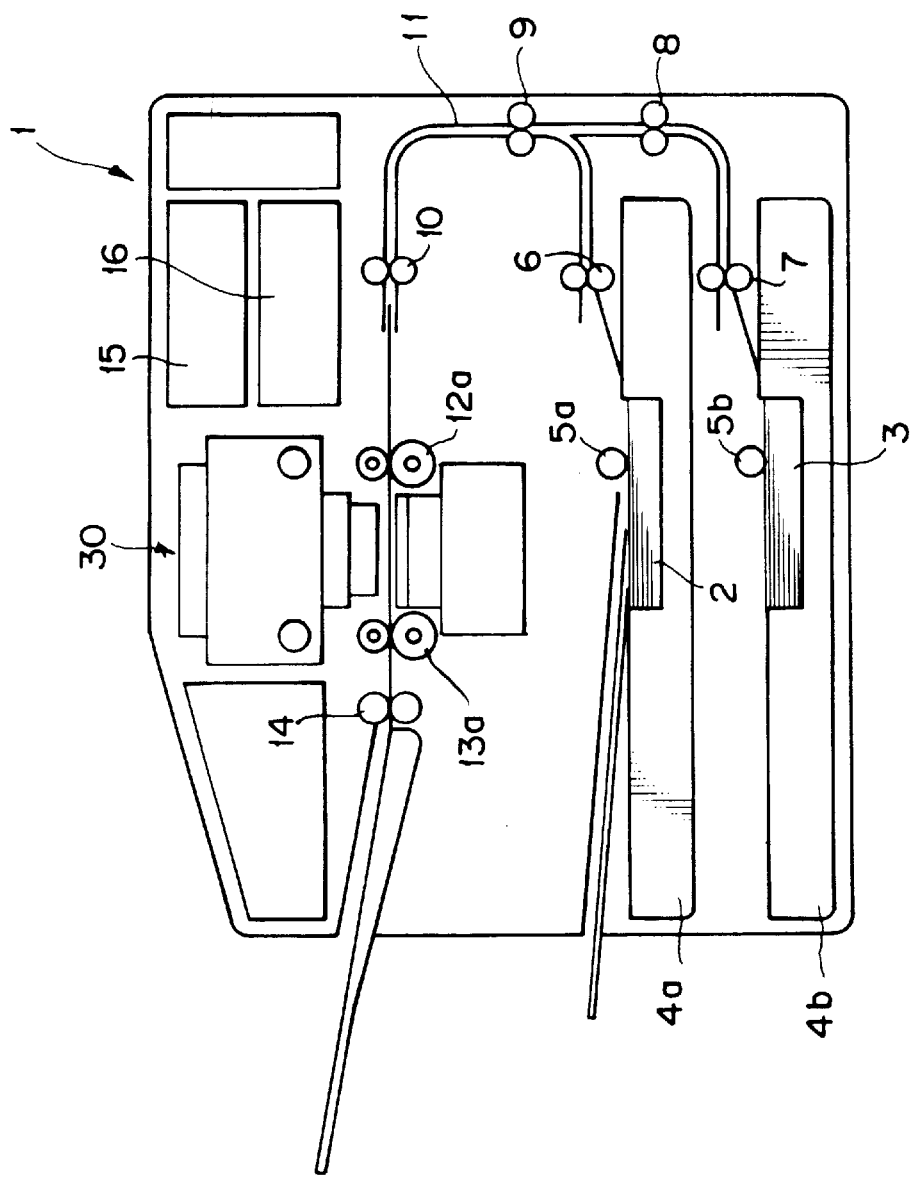
FIG. 1 is a vertical sectional view of an image forming apparatus constructed according to a first embodiment of the present invention, schematically showing the inner structure of the image forming apparatus.

FIG. 1 is a schematic sectional view of the ink jet recording apparatus according to the first embodiment of the present invention. In the drawing, reference numeral 1 designates a housing of the ink jet recording apparatus (hereinafter referred to as an apparatus housing), reference numeral 2 designates laminated plain papers each cut to predetermined dimensions to serve as a recording medium, reference numeral 3 designates a laminated exclusively usable papers (hereinafter referred to simply as EU papers) each likewise cut to predetermined dimensions, reference numeral 4a designates a cassette for storing the laminated plain papers 2, reference numeral 4b designates a cassette for storing the laminated EU papers 3, reference character 5a designates a pickup roller for successively delivering the plain papers 2 in the paper feeding direction, reference character 5b designates a pickup roller for successively delivering the EU papers 3 in the paper feeding direction, reference characters 6 to 10 designate plural pairs of rollers for conveying the recording medium, and reference character 11 designates a conveyance guide for the recording medium. Reference numeral 12a designates an auxiliary scanning roller for conveying the recording medium by a predetermined distance corresponding to the recordable width of an ink jet recording head to be described later and holding the recording medium at a predetermined position, reference numeral 13a designates a tension roller which rotates at a speed appreciably higher than the auxiliary scanning roller 12a to impart a certain magnitude of tension to the recording medium so as to prevent the recording medium from floating up, and reference numeral 14 designates a pair of paper discharging rollers for discharging the recording medium outside of the recording apparatus after the recording operation. With the ink jet recording apparatus constructed in the above-described manner, a conveyance path is formed for the recording medium fed from either the cassette 4a or 4b.

Reference numeral 15 designates an image processing section including a central processing unit (hereinafter referred to simply as CPU) for controlling a motor and an image to be formed, reference numeral 16 designates a buffer memory unit for temporarily memorizing image information, and reference numeral 30 designates an image forming section including an ink jet recording head, a carriage for displacing the ink jet recording head relative to the recording medium.

Figure 2:
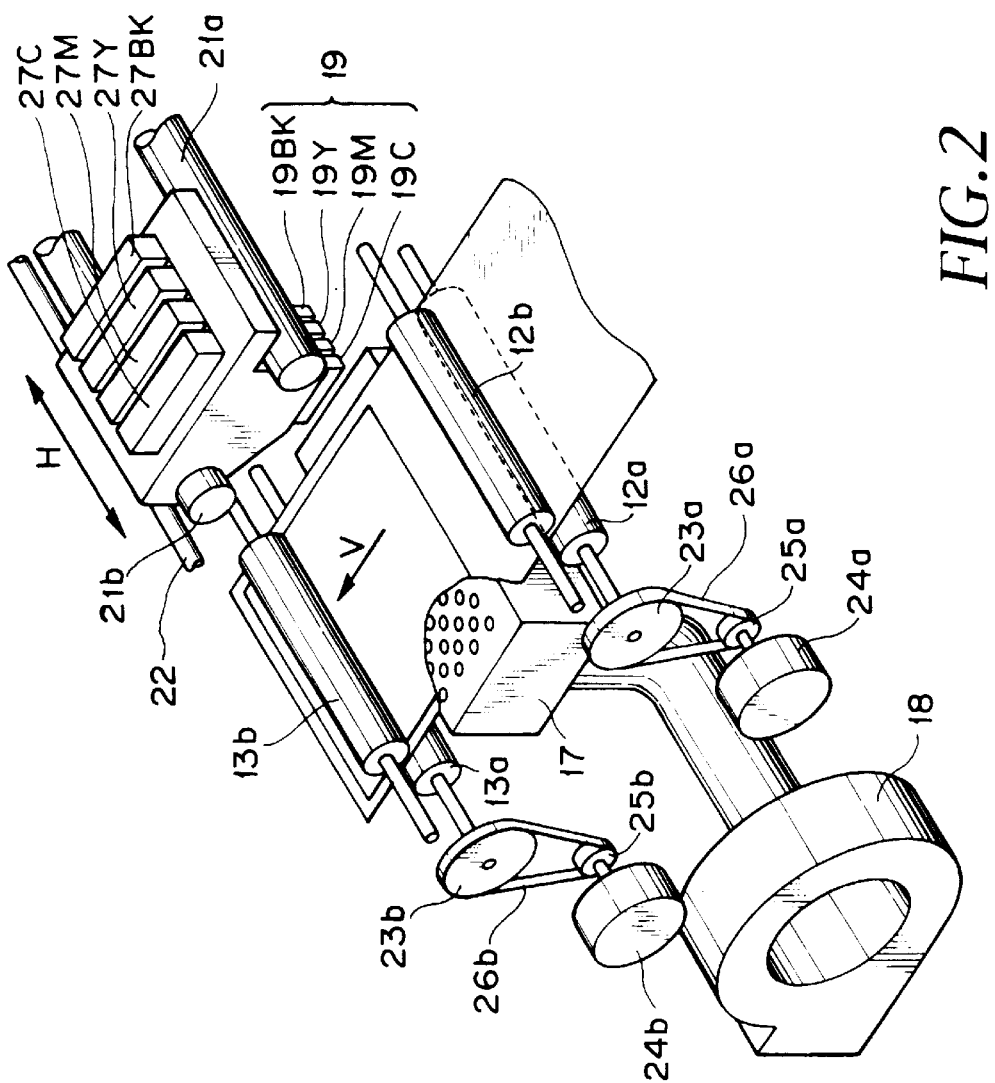
FIG. 2 is a perspective view of the image forming apparatus shown in FIG. 1.

FIG. 2 is a perspective view of the image forming apparatus, i.e., an ink jet recording apparatus including the image forming section 30 as an essential component. Reference numeral 12b designates a follower roller which is disposed on the upstream side of the image forming section 30 for conveying a recording medium in the clamped state in cooperation with the auxiliary scanning roller 12a, and reference numeral 13b designates a follower roller which is disposed on the downstream side of the image forming section 30 for conveying the recording medium in the clamped state in cooperation with the tension roller 13a. Reference numeral 17 designates a platen for supporting the recording medium. The platen 17 is communicated with a fan 18 via a number of small holes formed over a recording paper path surface thereof in order to prevent the recording medium from floating up during each recording operation.

Reference numeral 19 designates an ink jet recording head. In this embodiment, to form a full color image, the ink jet recording head 19 is composed of four recording head portions 19C, 19M, 19Y and 19Bk corresponding to four kinds of colors, i.e., a cyan (C), a magenta (M), a yellow (Y) and a black (Bk). They are arranged in the main scanning direction H in the side-by-side relationship. Each recording operation is achieved by ejecting four kinds of inks from a plurality of ejection orifices arranged one after another in the direction inclined at a predetermined angle relative to the main scanning direction H (e.g., in the auxiliary scanning direction V). Reference numerals 27C, 27M, 27Y and 27Bk designate ink tank portions which are combined with the recording head portions 19C, 19M, 19Y and 19Bk for the purpose of supplying four kinds of inks to the recording medium. The ink jet recording head 19 is mounted on the carriage 20 in such a manner as to be slidably displaced in the main scanning direction H at a right angle relative to the auxiliary scanning direction V, i.e., the direction of conveyance of the recording medium with the aid of two guide rails 21a and 21b extending in parallel with each other for performing a main scanning operation. The carriage 20 is driven by a pulse motor (not shown) and a driving belt 22.

Pulleys 23a and 23b are press-fitted to the lefthand ends of the auxiliary scanning roller 12a and the tension roller 13a, and as pulse motors 24a and 24b are rotationally driven, motor pulleys 25a and 25b are rotationally driven by the pulse motors 25a and 25b via endless power transmission belts 26a and 26b.

Figure 3:
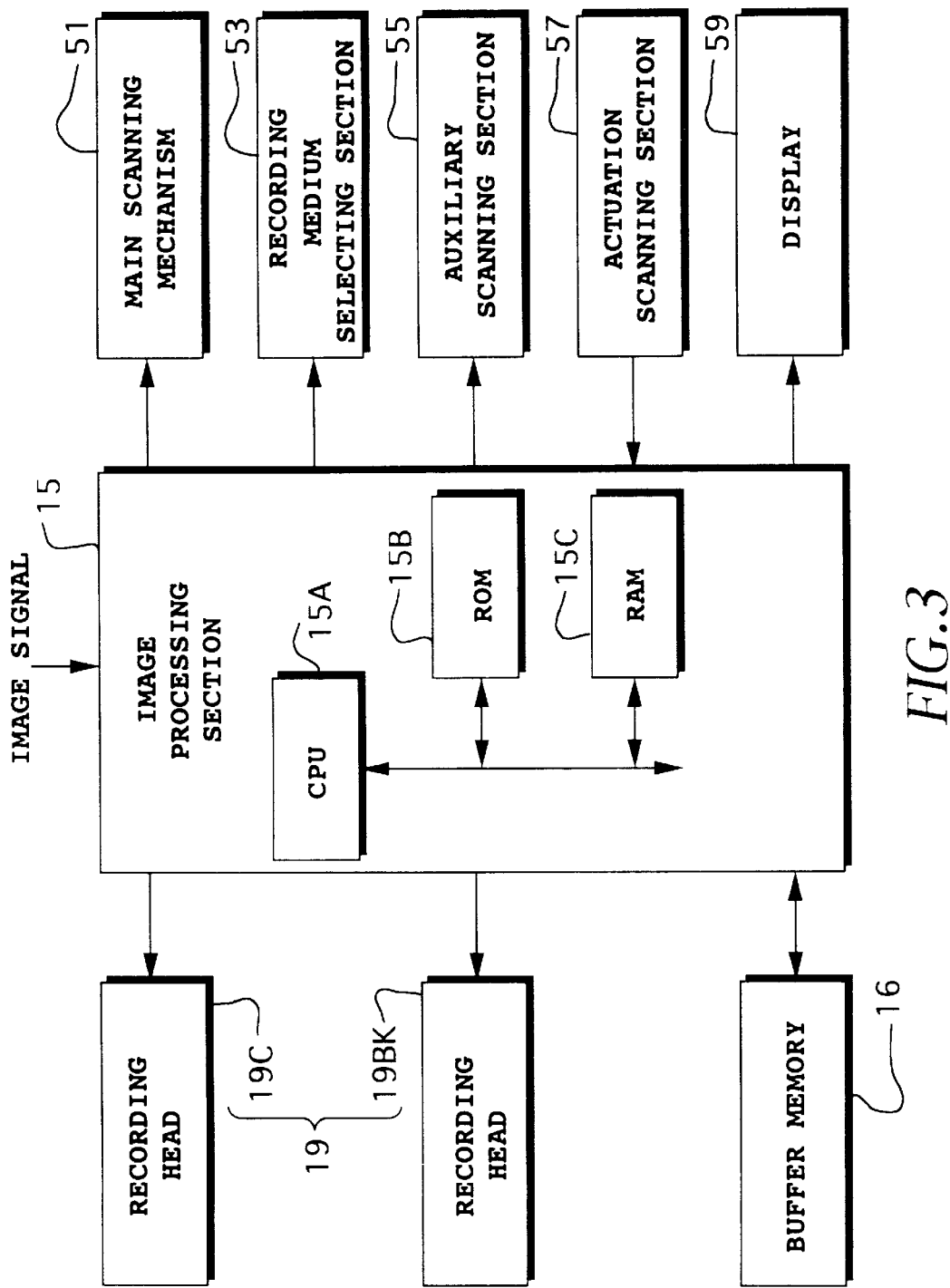
FIG. 3 is a block diagram which shows by way of example the structure of a controlling system for the image forming apparatus shown in FIG. 1.

FIG. 3 is a block diagram which shows by way of example the structure of a controlling system including a controller (not shown) for controlling the image forming apparatus constructed in the above-described mariner. The image processing section 15 includes CPU 15A for executing a processing procedure to be described later with reference to FIG. 4, ROM 15B storing fixed data such as a program corresponding to the processing procedure, and RAM 15C for storing working data. A main scanning mechanism 51 is a mechanism for scanning the carriage 20 having the ink jet recording head 19 (19C to 19B*k*) in the H arrow-marked direction as viewed in FIG. 2. A motor and associated components are involved in the main scanning mechanism 51.

A recording medium selecting section 53 selectively feeds either plain papers 2 stored in the cassette 4a or EU papers 3 stored in the cassette 4b. Pickup rollers 5a and 5b, plural pairs of rollers 6 to 9, motors for selectively driving the foregoing components and a driver are involved in the recording medium selecting section 53. An auxiliary scanning mechanism 55 conveys the recording medium in the V arrow-marked direction relative to the recording position of the ink jet recording head 19. Motors 24a and 24b and associated components are involved in the auxiliary scanning mechanism 55.

In FIG. 3, reference numeral 57 designates an actuation inputting section. The actuation inputting section 57 permits an operator to instruct a command for starting each recording operation, an online command associated with the controller, i.e., a host controlling unit (not shown) and a command for performing a recording operation by selectively using either plain papers or EU papers. In addition, the actuation inputting section 57 presets various kinds of operation modes one of which is practically employed for the image forming apparatus. Reference numeral 59 designates a displaying section for displaying the present operation mode and other items.

Figure 4:
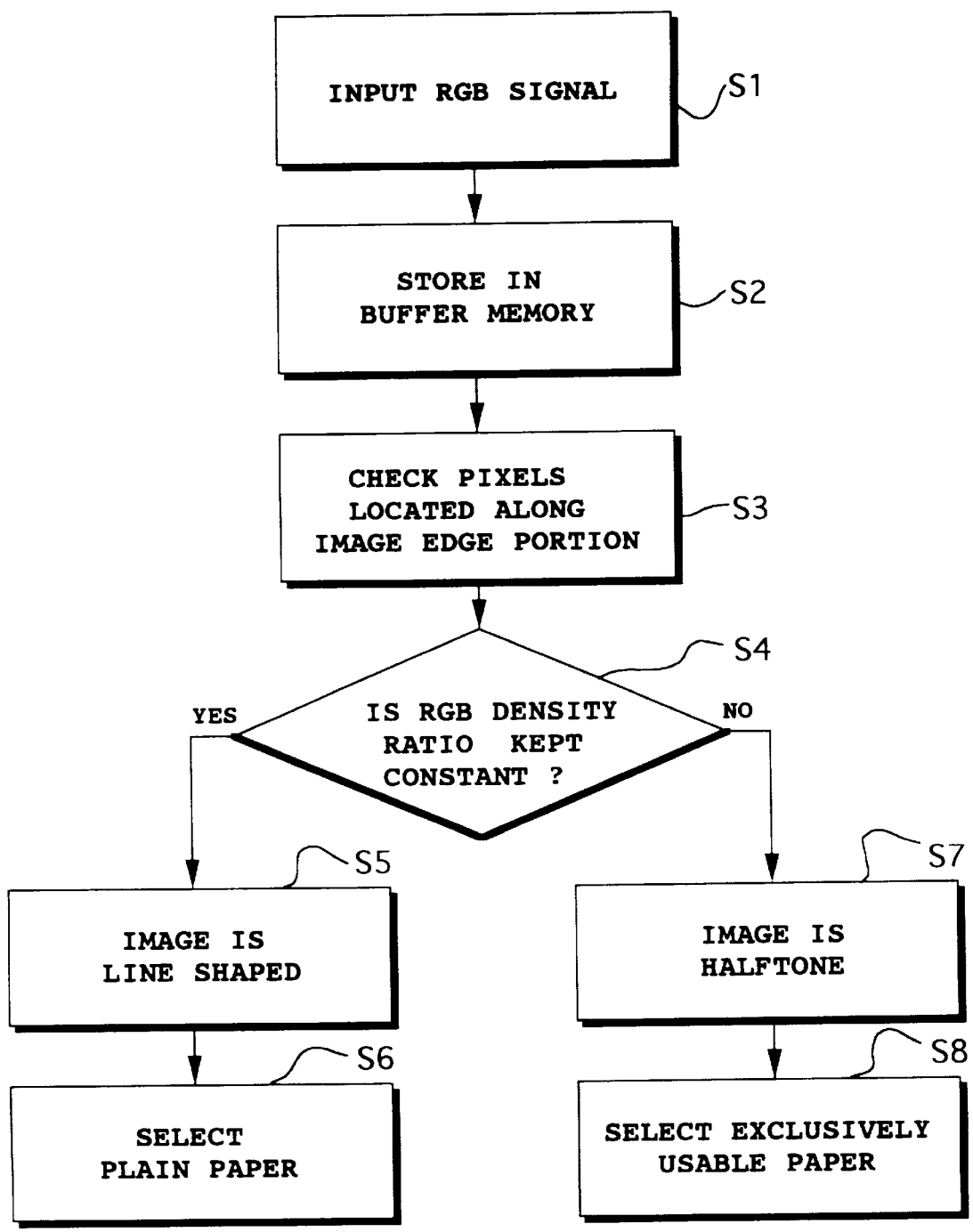
FIG. 4 is a flowchart which shows by way of example a series of steps to be executed by the image forming apparatus shown in FIG. 1.

FIG. 4 is a block diagram which shows by way of example a series of steps to be executed for selecting a recording medium for the image forming apparatus constructed according to the first embodiment of the present invention. According to this flowchart, The image processing section 15 is activated (Step S1) in response to an image signal inputted to the image processing section 15 from the host machine including, e.g., a computer, a scanner, a reader in the form of a RGB signal.

The image signals (i.e., R signal, G signal and B signal) are once memorized in a buffer memory 16 (Step S2) so that it is processed in the image processing section 15. Specifically, the image processing section 15 determines whether the inputted signal represents the image including only line-shaped images such as characters or the image including halftone images such as photographs (Step S3). For example, determination of black colored line-shaped images is made in the following manner.

Each color component of black colored image constituting the RGB signal exhibits a constant density ratio on the whole surface of the recording medium. Accordingly, it is possible to look for the pixels constituting the RGB signal of constant density ratio in the vicinity of image edge portion and to check how the black colored pixels continue within the area. When it is found that the black colored pixels continue one after another within the area, the controller determines that a black colored line-shaped image will be recorded on the recording medium. Similarly, with respect to other kinds of colors, if the pixels having a certain kind of color continue one after another in the vicinity of each image edge portion, the controller can determine that a character or a line-shaped image will be recorded on the recording paper (Step S5).

Each image is determined by employing the aforementioned determining method. When only characters or like-shaped images are recorded on the recording medium, a driving signal is outputted from CPU 15A to allow the pickup roller 5a to be driven by a motor (not shown) involved in the recording medium selecting section 53, whereby a plain paper 2 is conveyed from the cassette 4a toward the recording section (Step S6). Similarly, when it is determined that a halftone recording region including a photograph present in a part of the recorded image (Step S7), a driving signal is outputted from CPU 15A to allow the pickup roller 5b to be driven by a motor (not shown) involved in the recording medium selecting section 53, whereby an EU paper 3 is conveyed from the cassette 4b toward the recording section (Step S8) Finally, the RGB signal is transformed into four color signals, i.e., a C color signal, an M color signal, a Y color signal and Bk color signal. In response to these color signals, images are recorded on the recording medium with the aid of the ink jet recording head 19.

In this embodiment, images such as characters or line-shaped images derived from CAD outputs having no strict request are formed on a plain paper obtainable at a low unit cost. On the contrary, images such as photographs, computer-aided graphics having strict requests are formed on an expensive EU paper. Consequently, the image forming apparatus can be operated at a reduced running cost.

To assure that images are reliably recorded on each plain paper or EU paper corresponding to a quality of image, it is desirable that each of the cassettes 4a and 4b is specially designed to exhibit a specific configuration corresponding to plain papers or EU papers. Fitting portions on the image forming apparatus corresponding to the cassettes 4a and 4b are modified to match with the cassettes 4a and 4b. Alternatively, it is possible to attach the means for exhibiting an information of each recording medium (e.g., a switch, a marker or the like) to the cassette so that the controller proceeds the steps shown in FIG. 4 after a sensor disposed in the image forming apparatus reads the foregoing means.. Alternatively, it is also possible dispose the means for determining the kind of recording paper (e.g., a photosensor for discriminating the kind of paper depending on a difference in a quantity of reflected light beam) in the image forming apparatus. In addition, it is also possible that the image forming apparatus displays the kind of recording medium now in use to an operator.

(Embodiment 2)

Next, a second embodiment of the present invention will be described below with reference to FIG. 5. In this embodiment, the image forming apparatus, i.e., an ink jet recording apparatus, has the same hardware structure as that in the first embodiment or the present invention. However, with respect to the ink jet recording apparatus according to the second embodiment of the present invention, a maximum recording density is set to about 230%, while the density of the image fully coated with one ink represents 100%. The "density" stands for the amount of the ink adhered in certain area and is equivalent to the "printing ratio" or "printing density".

When the ink jet recording apparatus prints at a high recording density (e.g., in excess of 100%), there arise malfunctions that ink absorption and drying take a long timer an extra quantity of ink is undesirably transferred to the tension roller 13, the paper discharging roller 14 and others. Subsequently, the extra ink is retransferred to the recording medium, resulting in an image being formed on the recording medium in the disturbed state. The recorded image has poor color appearance.

Figure 5:
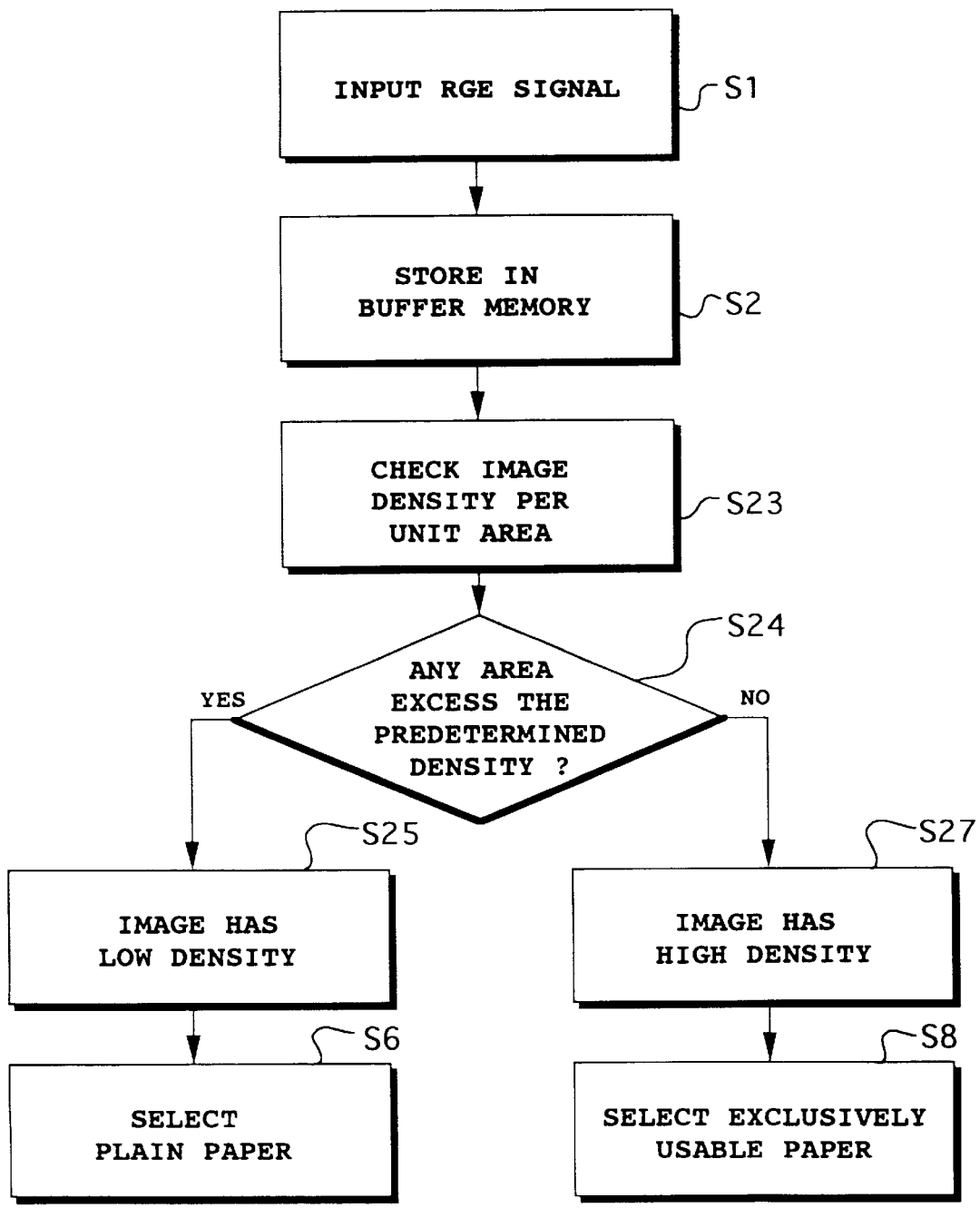
FIG. 5 is a flowchart which shows by way of example a series of steps to be executed by the image forming apparatus according to a second embodiment of the present invention.

To cope with the foregoing problems, a series of processing steps as shown in FIG. 5 via a flowchart is employed for the image forming apparatus in order to select a recording medium corresponding to the density of an image formed on a recording medium. This flowchart is substantially same as that in the first embodiment of the present invention (as shown in FIG. 4) with the exception that processings to be executed at Steps S23 to S25 and S27 are substituted for those to be executed at Steps S3 and S4. Specifically, on receipt of image data from the buffer memory 16, the image processing section 15 divides the whole recorded image into a predetermined number of unit areas and then examines a recorded image density of each unit area (Step S23). When it is found that at least one unit area having a density in excess of a predetermined one (represented by about 20% in terms of a printed density) is present on the recording medium (Step S24), the controller determines that the resultant recorded image is an image having a high density (Step S27). In response to a driving signal transmitted from CPU 15A, the pickup roller 5b is rotationally driven, causing an EU paper 3 to be conveyed from the cassette 4b toward the recording section (Step S8). On the other hand, when it is found that the whole printed image has a density lower than a predetermined one (Step S24 and Step S25), in response to a driving signal transmitted from CPU 15A, the pickup roller 5a is rotationally driven, causing a plain paper 2 to be conveyed from the cassette 4a toward the recording section (Step S6).

In this embodiment, when it is found that a recorded image has a low density, a recording operation to be performed using a plain paper is automatically selected. On the contrary, when it is found that a recorded image has a high density, a recording operation to be performed using an EU paper is automatically selected. Consequently, there does not arise a malfunction that ink is undesirably transferred onto a roller when an image having a high density is recorded on each plain paper, and moreover, a useless running cost to be borne by the image forming apparatus when an image having a low density is recorded on an EU paper can be reduced.

(Embodiment 3)

A third embodiment of the present invention will be described below with reference to FIG. 6. Also in this embodiment, the image forming apparatus, i.e., an ink jet recording apparatus is constructed in the substantially same manner as that in the first embodiment of the present invention with the exception that at the time of a recording operation, an operator can select a recording medium at his discretion with the aid of the actuation inputting section 57 (see FIG. 3).

Figure 6:
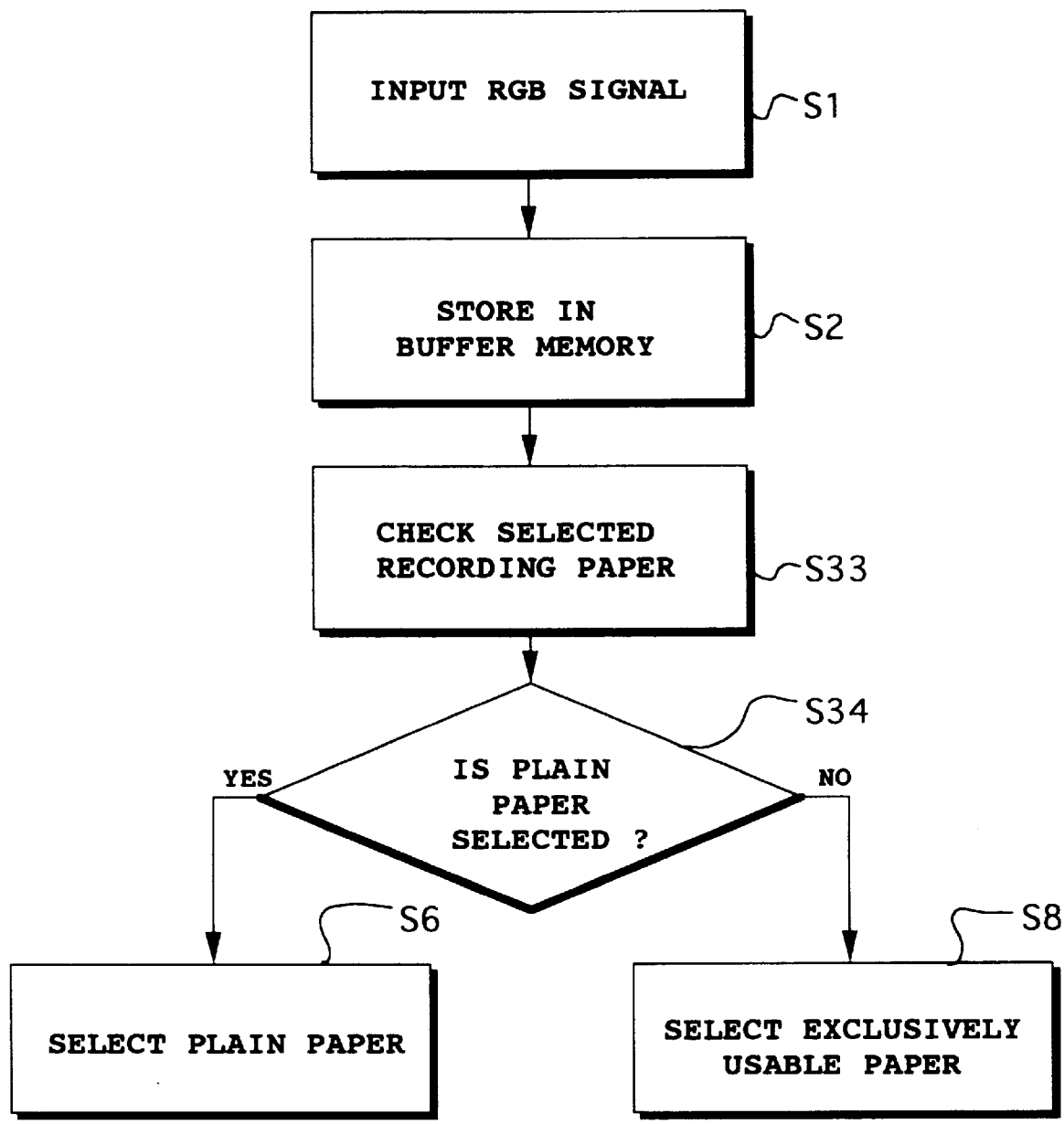
FIG. 6 is a flowchart which shows by way of example a series of steps to be executed by the image forming apparatus according to a third embodiment of the present invention.

Specifically, in this embodiment, a series of processing steps as shown in FIG. 6 is employed as a processing procedure similar to that shown in FIG. 4. When an operator visually determines that a recorded image is a line-shaped image or an image having a low density, causing a plain paper to be selected as a recording medium with the aid of the actuation inputting section 57 (Step S33 and Step S34), in response to a driving signal transmitted from CPU 15A in association with the selection signal induced by the foregoing selection, the pickup roller 5a is rotationally driven, causing a plain paper 2 to be conveyed from the cassette 4a toward the recording section. On the contrary, when he visually determines that a recorded image has a high density or he selects an EU paper as a recording medium by a user's request with the aid of the actuation inputting section 57, an EU paper 3 is selected.

In this embodiment, in the case that a high image quality is not required for the printing test to check image layout, even though a high quality is finally required, a running cost of the image forming apparatus can be reduced, because an adequate recording medium can be selected by an operator at his own discretion.

The three embodiments of the present invention have been described above with respect to an ink jet recording apparatus but the present invention should not be limited only to the ink jet recording apparatus. Alternatively, the present invention may equally be applied to all kinds of recording apparatuses having an EU paper as a recording medium. It goes without saying that it is possible to combine the aforementioned automatic selection of a recording medium in the first embodiment with manual selection being executed by an operator.

(Embodiment 4)

While the present invention has been described above with respect to three preferred embodiments wherein the present invention is applied to an ink jet recording apparatus, it can alternatively be applied to an electronic photographing type image forming apparatus.

Figure 7:
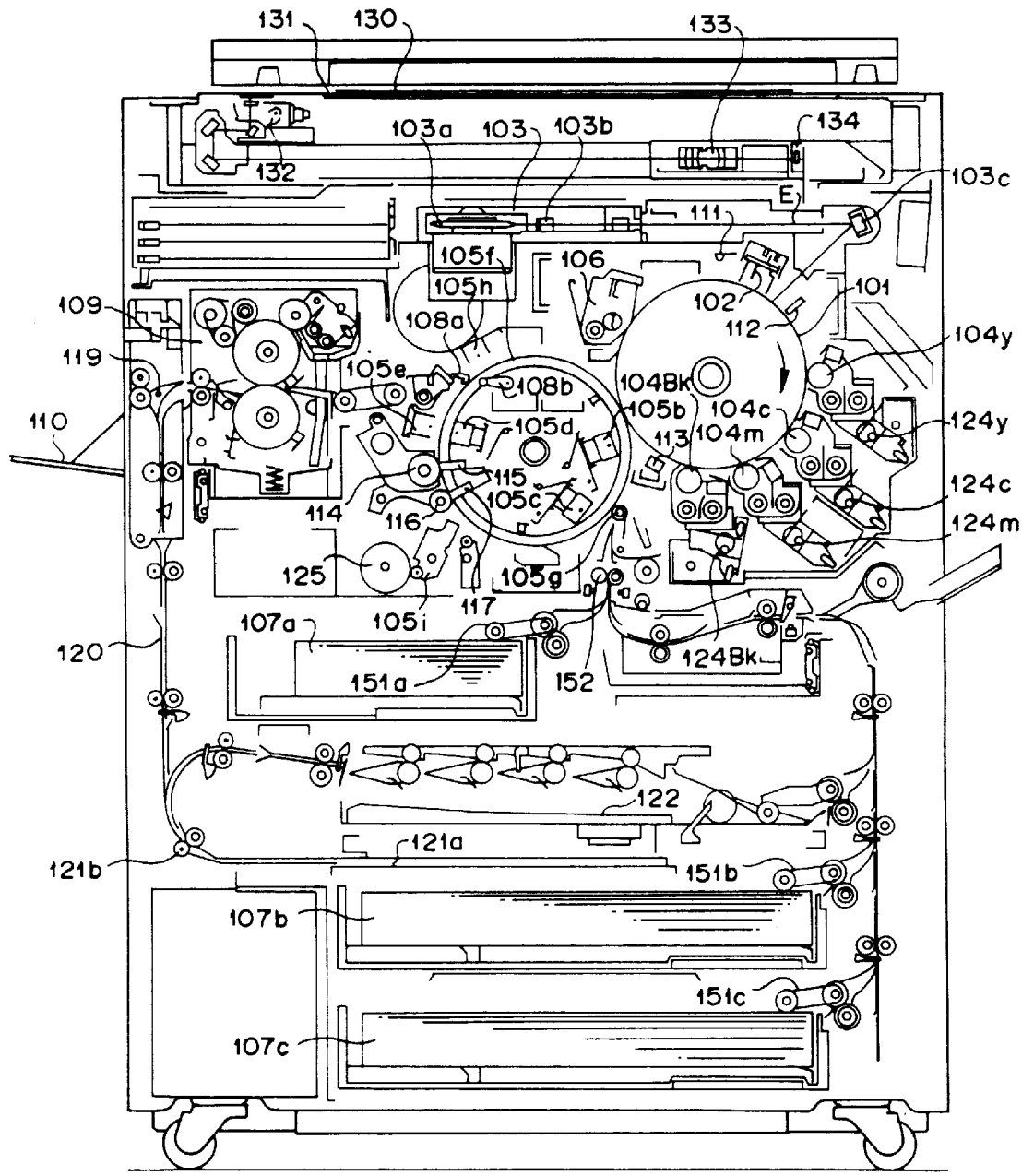
FIG. 7 is a vertical sectional view of an image forming apparatus constructed according to a fourth embodiment of the present invention.

FIG. 7 is a vertical sectional view of the electronic photographing type color image forming apparatus to which the present invention is applied.

The image forming apparatus includes a digital color image reader section at the upper part and a digital color image printer section at the lower part.

In the reader section, an original 130 is placed on a glass plate 131 of an original board. It is exposed to the light beam emitted from an exposing lamp 132 while the lamp is turned on, whereby it is scanned by the emitted light beam. The light beam reflected from the original 130 is collectively received by a full color sensor 134 via a lens 133, generating a color decomposed image signal. The image signal is processed in a video processing unit (not shown) via an amplifying circuit (not shown), and transmitted to the printer section.

At this time, the controller can also determine whether or not the original includes only line-shaped images such as characters or it includes pictorial images such as photographs, by employing the same method as explained above with reference to the flowchart shown in FIG. 4.

In addition, the controller can determine whether the original includes only images having a low density or it includes images having a high density, by the same method as explained above with the flowchart shown in FIG. 5.

The signals generated based on the foregoing determinations are transmitted to the printer section in addition to the foregoing color decomposed image signal.

In the printer section, a photosensitive drum 101 serving as an image carrier is supported in such a manner to rotate in the arrow-marked direction. An exposing lamp 111, a corona charger 102, a laser light beam exposing optical system 103, a potential sensor 112, four kinds of developing units 104y, 104c, 104m and 104Bk used for developing a different color, a light beam quantity detecting unit 113 located on the photosensitive drum 101, a transferring unit 105 and a cleaning unit 106 are arranged around the photosensitive drum 101.

The image signal fed from the reader section is transformed into an optical signal in a laser light beam outputting section (not shown) of the laser light beam exposing optical system 103. The transformed laser light beam is reflected at a polygonal mirror 103a, and subsequently, passes a lens 103b and a mirror 103c, projecting on the outer peripheral surface of the photosensitive drum 101.

On the other hand, as the photosensitive drum 101 is rotated in the arrow-marked direction, it is once electrically discharged by the exposing lamp 111 and uniformly electrically charged by the charger 102. Thereafter, a light image E having one of the decomposed colors is irradiated to the photosensitive drum 101 to form a latent image.

Next, the respective developing units 104y, 104c, 104m and 104Bk are activated to develop the latent image on the photosensitive drum 101 by forming a toner image composed of a synthetic resin as a main component. Subsequently, one of the four developing units 104y, 104c, 104m and 104Bk is displaced to the vicinity of the photosensitive drum 101 by actuating one of four eccentric cams 124y, 124c, 124m and 124Bk corresponding to each decomposed color.

A laminated recording medium is stored in each of cassettes 107a, 107b and 107c, and as one of pickup rollers 151a, 151b and 151c is driven, recording mediums are successively delivered onto a conveyance path. As a paper feeding motor (not shown) is driven, each of the pickup rollers 151a, 151b and 151c is selectively rotated via a clutch. For example, it is assumed that EU papers usable for forming a full color image are stored in the cassettes 107a and 107b and plain papers are stored in the cassette 107c. In response to an original image determining signal transmitted from the reader section to inform a request for a full color image, an EU paper is discharged from one of the cassettes 107a and 107b. On the contrary, in response to another original image determining signal transmitted from the reader section to inform a request for an image having a low density, a plain paper is discharged from the cassette 107c. In such manner, an adequate recording medium can be delivered to a conveyance path.

As the recording medium is delivered to the conveyance path by one of the pickup rollers 151a, 151b and 151c, it reaches a resist roller 152 via several pairs of rollers. Slantwise conveyance of the recording medium is corrected by the resist roller 152, if any, and after the correction, the recording medium is conveyed to a transferring section.

After the recording medium is fed from one of the cassettes 107a, 107b and 107c to the position opposite to the photosensitive drum 101 via the conveyance system and the transferring unit 105, the toner image on the photosensitive drum 101 is transferred to the recording medium. The transferring unit 105 is composed of a transferring drum 105a, a transferring charger 105, an absorbing charger 105c for electrostatically absorbing the recording medium, an absorbing roller 105g located opposite to the absorbing charger 105c, an inside charger 105d and an outside charger 105e. The transferring drum 105a is supported in such a manner to rotate, and a recording medium holding sheet 105f molded of a dielectric material is cylindrically integrated with the transferring drum 105a around the outer peripheral opening region of the latter. The recording medium holding sheet 105f is usually made of a dielectric sheet such as a polycarbonate film.

As the transferring drum 105a serving as a drum-shaped transferring unit rotates, the toner image on the photosensitive drum 105a is transferred onto the recording medium held on the recording medium holding sheet 105f with the aid of the transferring charger 105b.

In such manner, as the recording medium is conveyed and absorbed onto the recording medium holding sheet 105f, a desired number of color images are transferred onto the recording medium to form a full color image on the recording medium.

On completion of the transferring operation for the toner image composed of four kinds of colors, the recording medium is separated from the transferring drum 105a with the aid of a separating pawl 108a, a separating/raising roller 108b and a separating charger 105h, and thereafter, it is discharged on a tray 110 via a heat roller type fixing unit 109.

After completion of the transferring operation, the toner remaining on the outer peripheral surface of the photosensitive drum 101 is completely removed in a cleaning unit 106, and, a series of image forming steps start again with the photosensitive drum 101.

In the case that an image is formed on the opposite surfaces of the recording medium, a conveyance path shifting guide 119 is actuated immediately after the recording medium is discharged from the fixing unit 109 so as to allow the recording medium to be once conducted to a reversing path 121a via a vertically extending conveyance path 120. Subsequently, a reversing roller 121b rotates in the reverse direction, causing the recording medium to be discharged in the opposite direction relative to the preceding conveying direction while the rear end of the recording medium is taken as a fore end, whereby the recording medium is received in an intermediate tray 122. Thereafter, another image is formed on the other surface of the recording medium via a series of image forming steps as mentioned above.

To prevent powder particles from being scattered and deposited on the recording medium holding sheet 105f of the transferring drum 105a and to prevent oil on the recording medium from adhering to the same, a cleaning operation is performed by using a fur brush 114, a backup brush 115 facing to the fur brush 114 with the recording medium holding sheet 105f interposed therebetween, an oil removing roller 116 and a backup brush 117 facing to the oil removing roller 116 with the recording medium holding sheet 105f interposed therebetween. Usually, a cleaning operation is performed before an image is formed on the recording medium or after it is formed on the same or when a malfunction of jamming i.e., a malfunction of paper clogging occurs.

In addition, in this embodiment, the gap between the recording medium holding sheet 105 and the photosensitive drum 101 can arbitrarily be determined by actuating an eccentric cam 125 in a predetermined timing relationship, and moreover, actuating a cam follower 105c integrated with the transferring drum 105f. For example, when the image forming apparatus is held in the standby state or a power source is turned off, the transferring drum 105 is parted away from the photosensitive drum 101.

Since the electronic photographing system is employed for practicing this embodiment, the image forming operation can be operated at a reduced running cost with a material cost removed from the latter, and moreover, each image can be formed at a high speed with the image forming apparatus. Consequently, an image forming apparatus operates at a reduced running cost while working in shorter time.

The image forming apparatus may be equipped with a shifting unit for shifting plain papers to EU papers, and vice versa in response to an input given by an operator in the same manner as the third embodiment of the present invention. EU papers usable for recording images formed on the opposite surfaces may be selected as recording mediums.

The aforementioned four embodiments of the present invention have been described with respect to an ink jet recording apparatus and an electronic photographing type recording apparatus. However, the present invention should not be limited only to these types of recording apparatuses. The present invention may equally be applied to all kinds of recording apparatuses having an EU paper used as a recording medium. The present invention may individually be applied to each of these embodiments. It goes without saying that it is possible to combine the aforementioned automatic selection of a recording medium depending on the kind of a recorded image in the first embodiment of the present invention with manual selection to be executed by an operator.

Additionally, a desired kind of recording paper may be fed to the image forming apparatus by detecting properties of a selected recording paper, e.g., flatness, smoothness and whiteness of the surface, a thickness, and a contour of the latter.

(Embodiment 5)

Figure 8A:
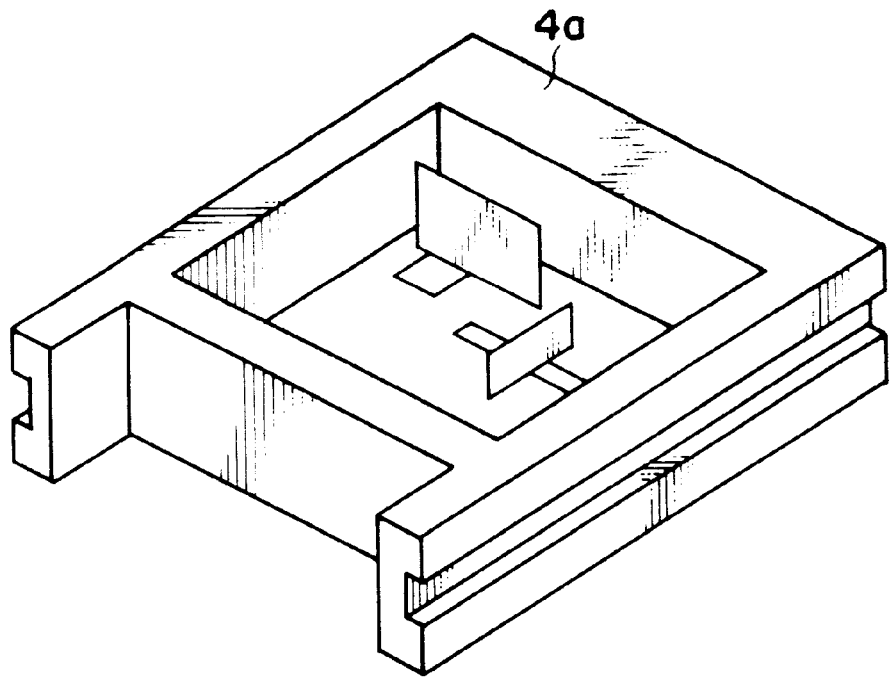
FIG. 8A and FIG. 8B are perspective views each of which shows a cassette having an actuator according to a fifth embodiment of the present invention.
Figure 8B:
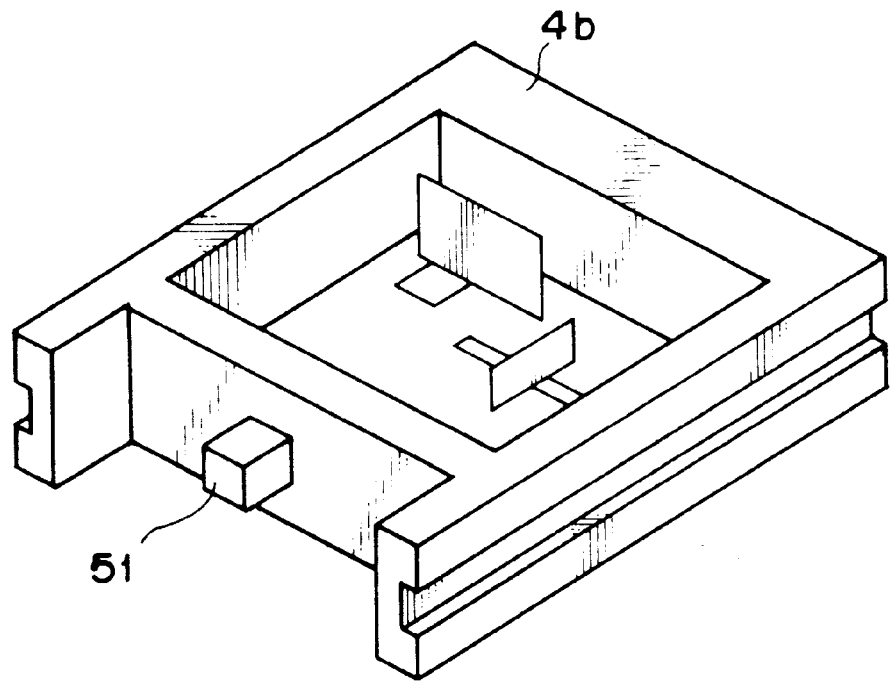

To assure that a plain paper or an EU paper is selectively used as a recording medium depending on the kind of a recorded image, it is possible to employ a method of preparing two kinds of cassettes, one of them storing laminated plain papers and the other one storing a laminated EU papers. The foregoing method will be described with reference to FIG. 8A and FIG. 8B. FIG. 8A is a perspective view of a cassette 4a for plain papers, and FIG. 8B is a perspective view of a cassette 4b for EU papers. A protuberant actuator 51 is disposed on the rear surface of the cassette 4b. After the cassette 4b is inserted into the image forming apparatus, the actuator 51 is actuated to thrust a switch 50b disposed on the innermost side of a cassette receiving section in an apparatus housing. In response to a signal outputted from the switch 50b, the controller recognizes that the cassette 4b stores laminated EU papers.

Thus, in the case that EU papers are required corresponding to an information of the image, the controller allows an operator to select the cassette 4b.

In the first embodiment of the present invention, the cassette 4b is disposed at the lower stage of the apparatus housing. When the cassette 4b is disposed at the upper stage of the same, the controller confirmatively recognizes based on the actuation of the switch 50a that the cassette 4b stores laminated EU papers.

Figure 9A:
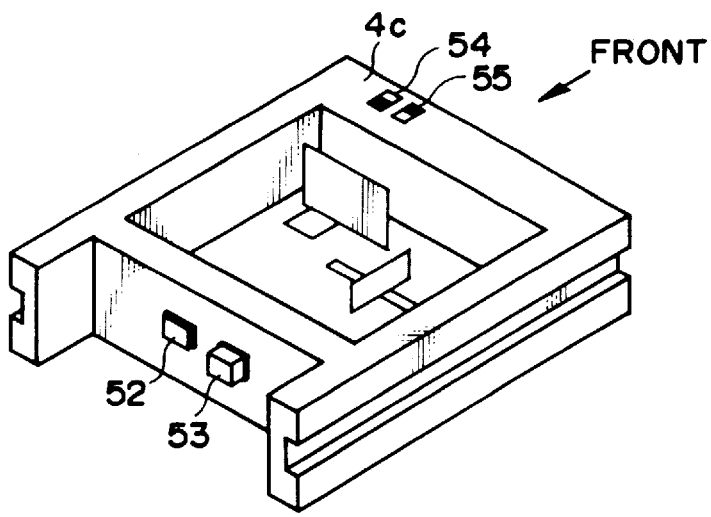
FIG. 9A, FIG. 9B and FIG. 9C are illustrative views each of which shows a cassette having a slide switch.
Figure 9B:
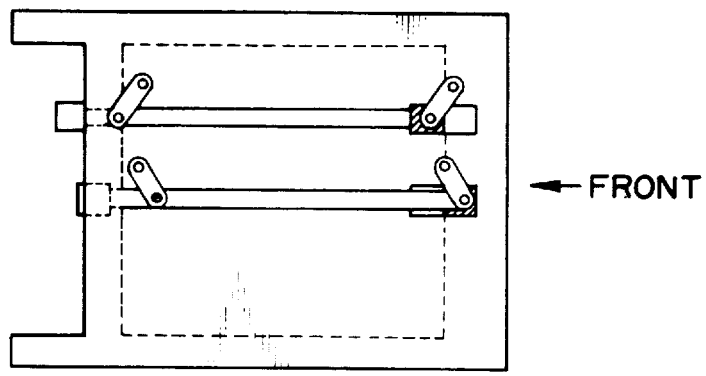
Figure 9C:
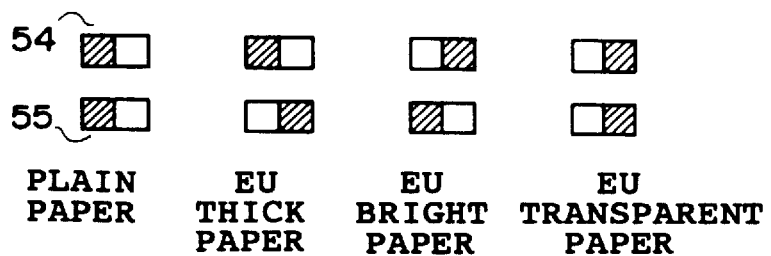

In addition, a single kind of cassette may be equipped with a mechanism for indicating, whether the plain papers or EU papers are stored in it. This kind of cassette will be described below with reference to FIG. 9A, 9B and 9C. As shown in the drawings, two slide switches 54 and 55 and two actuators 52 and 53 are disposed on a cassette 4. As shown in FIG. 9B, the switches 52 and 53 are connected to the actuators 54 and 55 on the bottom surface of the cassette 4 via two link mechanisms. Additionally, two switches are disposed at each stage in the cassette receiving section of the apparatus housing. With this construction, it is possible to discriminate four kinds of recording papers by combining the situations of two slide switches. As shown in FIG. 9C, in addition to plain papers, the controller can discriminate, e.g., an EU thick paper, an EU bright paper and an EU transparent paper. The controller can select an appropriate EU paper corresponding to the quality of an image to be recorded. Since many kinds of recording papers can be handled by a single kind of cassette, it is not necessary to prepare many kinds of cassettes.

The number of each of slide switches, actuators and switches disposed in the apparatus housing may adequately be increased or decreased corresponding to the number of kinds of recording papers to be handled. According to this embodiment, a plain paper or an EU paper can reliably be selected based on the information of the image.

Since the controller discriminates the kind of recording papers stored in a cassette at each stage in the apparatus housing, the foregoing information can be displayed on the display board or the screen of a displaying unit. This enables an operator to select the kind of recording paper easily.

(Embodiment 6)

Figure 10:
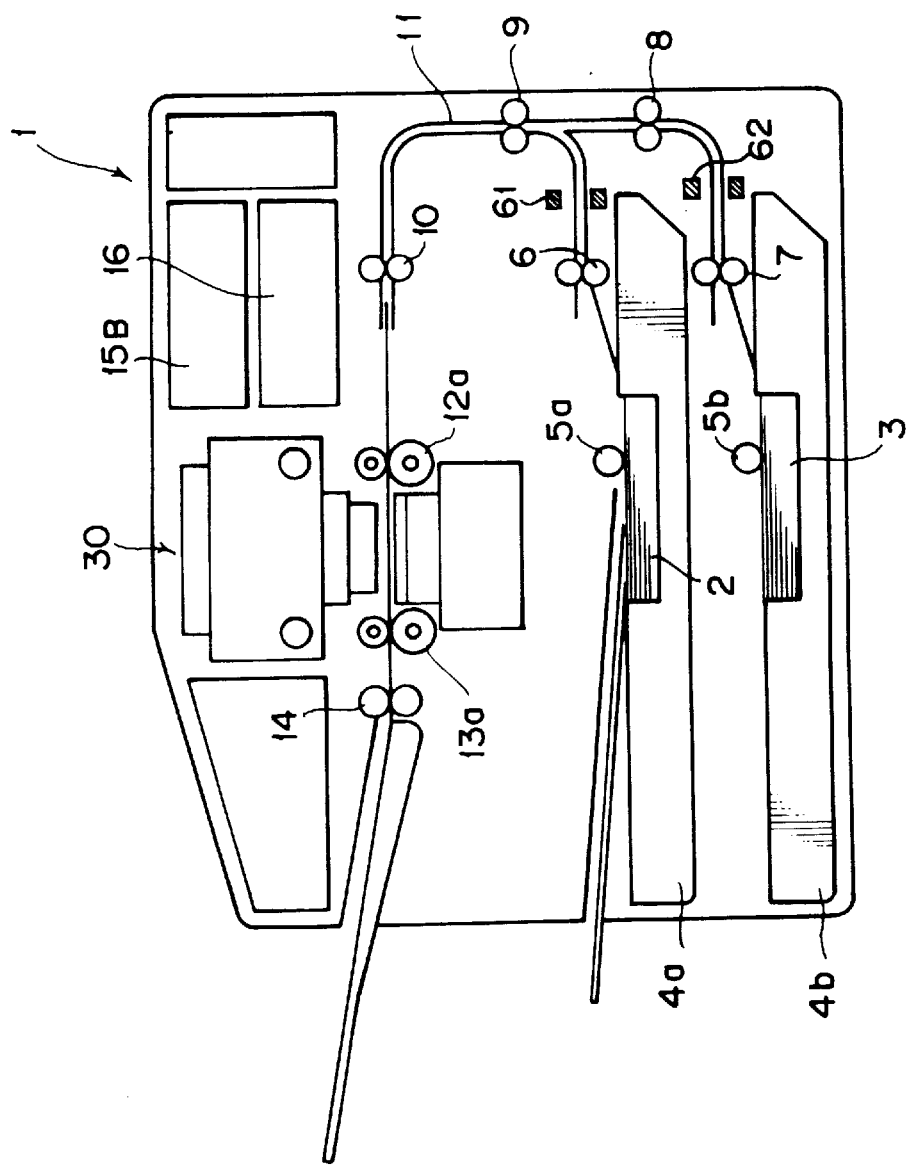
FIG. 10 is a vertical sectional view of an image forming apparatus constructed according to a sixth embodiment of the present invention wherein the image forming apparatus is equipped with a paper kind detecting sensor.

The kind of recording paper can be discriminated by one of three methods as described below. Each of these methods will be described with reference to FIG. 10. The same members as those in the first embodiment of the present invention described above with reference to FIG. 1 are designated by same reference numerals. Thus, repeated description on these members will not be required.

When a cassette 4a or 4b is inserted into an apparatus housing, a pickup roller 5a or 5b starts rotating and causes a paper feeding operation. Each recording paper is conveyed by a pair of conveying rollers 6 or 7, and when it collides against a pair of conveying rollers 8 or 9, conveyance of the recording paper is stopped. Then, the controller discriminates the kind of recording paper by one of the following three methods.

(1) The surface of an EU paper is usually smoother and brighter than a plain paper. In view of the foregoing fact, reflection type sensors 61 and 62 are disposed in the apparatus housing to discriminates the kind of recording paper by measuring a reflection coefficient on the surface of each recording paper. The controller compares data of the measured reflection coefficient with data preliminarily stored in ROM 15B in the form of a table. When the measured reflection coefficient is larger than the preliminarily stored value, the controller determines that the recording paper is an EU paper.

(2) In the case that an EU paper has a thickness larger than that of a plain paper, reflection type thickness sensors 61 and 62 are disposed in the apparatus housing to discriminate the kind of recording paper. In response to a signal from the thickness sensor 61 or 62, the controller determines a thickness of the recording paper and then compares the thickness of the recording paper with data on the thickness of each recording paper preliminarily stored in ROM 15B in the form of a table. When the determined thickness is larger than the value preliminarily stored in ROM 15B, the controller determines that the recording paper is an EU paper.

(3) In the case that an EU paper is prepared in the form of a transparent sheet to allow a light beam to penetrate therethrough, penetration type sensors 61 and 62 serve as a unit for automatically discriminating the kind of recording paper. A light beam penetration coefficient of each recording paper is measured by the sensor 61 or 62. The controller compares thus measured penetration coefficient with data preliminarily stored in ROM 15B in the form of a table. When the measured penetration coefficient is larger than the preliminarily stored data value, the controller determines that this recording paper is an EU paper.

On the assumption that the kind of recording paper is determined in the above-described manner, in response to an image signal transmitted from the reader section, a properly selected recording paper is fed to the image forming section in the apparatus housing.

Since the unit for discriminating the kind of recording paper is disposed in the image forming apparatus, the controller can distinguish a plain paper from an EU paper without any necessity for changing the contour of cassette or disposing a special mechanism in the cassette. In addition, an image forming apparatus which can handle various kinds of recording papers and which is be fabricated with a simple structure can be realized by employing one of the methods as described in the preceding paragraphs (1) to (3) or combining it with the method described above in connection with the fifth embodiment of the present invention.

As described above, according to the present invention, a recording medium can be selected corresponding to a quality of image to be formed thereon. An image such as a character or the like having no strict request for a quality of image is formed on an inexpensive plain paper so as to reduce a running cost required for forming each image. On the contrary, an image such as a photograph or the like having a strict request for a quality of image is formed on an EU paper, resulting in quality image.

In addition, according to the present invention, an image having no strict request for a quality can be formed on a recycled paper to protect an environment from damage.

Additionally, according to the present invention, in the case that an image such as a character or the like is formed on a recording medium on which additional items are often written with a writing tool after the image forming operation, it is possible to select a plain paper as a recording medium.

Further, according to the present invention, when an ink jet recording apparatus is operated as the image forming apparatus, a recording medium is selected in such a manner that an image requiring a large quantity of ink is formed on an EU paper having excellent ink absorbability and exhibits an excellent color appearance property, while an image requiring a small quantity of ink is formed on a plain paper. Consequently, a running cost for forming image can be reduced while assuring that a quality image is formed on the recording medium.

The present invention achieves distinct effect, when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: The ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image forming apparatus comprising:

image forming means for forming an image on a recording medium;

plain paper feeding means for feeding a plain paper to said image forming means as the recording medium;

exclusively usable paper feeding means for feeding an exclusively usable paper suitable for forming an image with said image forming means to the image forming means as the recording medium;

selecting means for selecting a recording medium to be used corresponding to a quality of the image to be recorded thereon;

selected paper feeding means for feeding the recording medium to be used to said image forming means utilizing said plain paper feeding means or said exclusively usable paper feeding means corresponding to the selected kind of the recording medium; and image determining means for determining whether an image to be recorded includes a halftone image or not, wherein said selecting means selects the exclusively usable paper as the recording medium to be used when said image determining means determines that a halftone image is included in the image to be recorded, and selects the plain paper as the recording medium to be used when said image determining means determines that no halftone image is included in the image to be recorded.

2. The image forming apparatus as claimed in claim 1, wherein said image forming means allows a plurality of printing materials having different color tones to be printed on said recording medium, and said exclusively usable recording paper is suited for a printing operation to be performed using said plurality of printing materials.

3. The image forming apparatus as claimed in claim 1, further including density detecting means for detecting an image density of every predetermined area, wherein said selecting means selects the recording medium depending on the detection of the density detecting means.

4. The image forming apparatus as claimed in claim 3, wherein said selecting means selects the exclusively usable paper when the density detecting means detects the area which has higher density than a predetermined density and selects the plain paper when the exclusively usable paper is not selected.

5. The image forming apparatus as claimed in claim 1, further comprising manual selecting means for selecting the kind of recording medium in response to an input generated by manual actuation.

6. The image forming apparatus as claimed in claim 1, wherein said image forming means utilizes ink.

7. The image forming apparatus as claimed in claim 6, wherein said image forming means comprises an ink jet recording head which forms an image on each recording medium by ejecting the ink onto the recording medium.

8. The image forming apparatus as claimed in claim 7, wherein said ink jet recording head comprises thermal energy generating means for causing film boiling of the ink so as to generate an energy effective for ejecting the ink to the recording medium.

9. An image forming apparatus comprising:

image forming means for forming an image on a recording medium;

a plurality of storing means for storing each of plural kinds of recording mediums;

detecting means for detecting the kind of recording medium stored in each of said storing means;

conveying means for conveying each of said plural kinds of recording mediums stored in said plurality of storing means to said image forming means;

selecting means for selecting one of the plural kinds of recording mediums corresponding to a quality of image to be formed;

controlling means for controlling selection of the storing means storing recording mediums selected by said selecting means, and controlling conveying of the selected recording mediums from the storing means to said image forming means; and image determining means for determining the quality of the image to be formed on each recording medium, wherein said selecting means selects the recording medium based on the determination made by said image determining means, and said image determining means determines whether the image to be formed contains a halftone image or not.

10. The image forming apparatus as claimed in claim 9, wherein said image determining means determines whether each formed image contains a part having a density higher than a predetermined density or not.

11. The image forming apparatus as claimed in claim 9, wherein each of said storing means comprises a cassette member in which recording mediums are stored, said cassette member includes cassette discriminating means, and said detecting means detects the kind of recording mediums stored in each of said plurality of storing means utilizing said cassette discriminating means.

12. The image forming apparatus as claimed in claim 9, wherein each of said plurality of storing means comprises a cassette member in which recording mediums are stored, and said detecting means optically detects the kind of recording medium stored in each of said cassette members.

13. An image forming method effected by an image forming apparatus including image forming means for forming an image on a recording medium, plain paper feeding means for feeding a plain paper to said image forming means as the recording medium, and exclusively usable paper feeding means for feeding an exclusively usable paper suitable for forming an image on said exclusively usable paper with said image forming means to the image forming means as the recording medium, said method comprising the steps of:

selecting a recording medium to be used corresponding to a quality of the image to be formed on each recording medium;

feeding the recording medium to the image forming means corresponding to the selected kind of recording medium utilizing the plain paper feeding means or the exclusively usable feeding means;

forming the image on the recording medium; and determining whether a recorded image includes a halftone image or not, wherein said selecting step comprises selecting the exclusively usable paper as the recording medium when determined in said determining step that the halftone image is included, and selecting the plain paper as the recording medium when the exclusively usable paper is not selected.

14. The image forming method as claimed in claim 13, wherein a plurality of printing materials having different color tones are printed on the recording medium in said image forming step, and the exclusively usable recording paper is selected when the plurality of printing materials are used.

15. The image forming method as claimed in claim 14, further comprising a step of detecting an image density of every predetermined unit area of an image to be formed, said selecting step selecting a recording medium based on the detection made in said detecting step.

16. The image forming method as claimed in claim 15, wherein when determined in said detecting step that a unit area having a density higher than a predetermined density is included in the image, said selecting step selects the exclusively usable paper as the recording medium, and when the exclusively usable paper is not selected, said selecting step selects the plain paper as the recording medium.

17. The image forming method as claimed in claim 13, further comprising a step of detecting an image density of every predetermined unit area of an image to be formed wherein, said selecting step selects the recording medium based on the detection made in said detecting step.

18. The image forming method as claimed in claim 7, wherein when determined in said detecting step that a unit area having a density higher than the predetermined density is included in the image, said selecting step selects the exclusively usable paper as the recording medium, and when the exclusively usable paper is not selected, said selecting step selects the plain paper as the recording medium.

19. The image forming method as claimed in claim 13, further including a manual selecting step of selecting the kind of recording medium in response to an input generated by manual actuation.

20. The image forming method as claimed in claim 13, wherein ink is utilized in said image forming step.

21. The image forming method as claimed in claim 20, wherein said image forming step utilizes as the image forming means an ink jet recording head adapted to form an image on each recording medium by ejecting the ink onto the recording medium.

22. The image forming method as claimed in claim 21, wherein the ink jet recording head includes a thermal energy generating means for causing film boiling of the ink so as to generate an energy effective for ejecting the ink to the recording medium.

23. The image forming method as claimed in claim 13, wherein said image forming step, utilizes as the image forming means electronic photographing type recording means.

24. The image forming method effected by an apparatus including a plurality of storing means each storing one of plural kinds of recording mediums, image forming means for forming an image on each recording medium, and conveying means for conveying each of the recording mediums stored in said plurality of storing means to said image forming means, said method comprising the steps of:
   detecting the kind of recording medium stored in each of said plurality of storing means;
   selecting a recording medium corresponding to a quality of the image to be formed; and
   controlling detection of a storing means having a recording medium selected in said selecting step from among the plurality of receiving means and controlling conveyance of each recording medium stored in the plurality of storing means to the image forming means utilizing the conveying means.

25. The image forming method as claimed in claim 24, further comprising the step of determining an image, wherein said selecting step selects the recording medium based on the determination made in said image determining step.

26. The image forming method as claimed in claim 24, wherein each of the plurality of storing means comprises a cassette member in which the recording mediums are stored, the cassette member includes cassette discriminating means, and said detecting step detects the kind of recording medium stored in each of said plurality of storing means utilizing the cassette discriminating means.

27. The image forming method as claimed in claim 24, wherein each of the plurality of storing means comprises a cassette member, and said detecting step optically detects the kind of recording medium stored in each of the cassette members.

28. An image forming apparatus comprising:
   image forming means for forming an image on a recording medium;
   plain paper feeding means for feeding a plain paper to said image forming means as the recording medium;
   exclusively usable paper feeding means for feeding an exclusively usable paper suitable for forming an image with said image forming means to the image forming means as the recording medium;
   selecting means for selecting a recording medium to be used corresponding to a quality of the image to be recorded thereon;
   selected paper feeding means for feeding the recording medium to be used to said image forming means utilizing said plain paper feeding means or said exclusively usable paper feeding means corresponding to the selected kind of the recording medium; and
   density detecting means for detecting an image density of every predetermined area of the image to be formed, wherein said selecting means selects the recording medium depending on the detection by said density detecting means.

29. The image forming apparatus as claimed in claim 28, wherein said image forming means uses a plurality of printing materials having different color tones to print on the recording medium, and the exclusively usable recording paper is suited for a printing operation to be performed using the plurality of printing materials.

30. The image apparatus as claimed in claim 29, further comprising image determining means for determining whether the image to be recorded includes a halftone image or not, wherein said selecting means selects the exclusively usable paper as the recording medium when said image determining means determines that the halftone is included in the image to be recorded, and selects the plain paper as the recording medium when said image determining means determines that no halftone image is included in the image to be recorded.

31. The image forming apparatus as claimed in claim 28, wherein said selecting means selects the exclusively usable paper when the density detecting means detects an area which has higher density than a predetermined density and selects the plain paper when the exclusively usable paper is not selected.

32. The image apparatus as claimed in claim 28, further comprising image determining means for determining whether the image to be recorded includes a halftone image or not, wherein said selecting means selects the exclusively usable paper as the recording medium when said image determining means determines that the halftone is included in the image to be recorded, and selects the plain paper as the recording medium when said image determining means determines that no halftone image is included in the image to be recorded.

33. The image forming apparatus as claimed in claim 28, wherein said selecting means selects the exclusively usable paper when the density detecting means detects a unit area which has higher density than a predetermined density and selects the plain paper when the exclusively usable paper is not selected.

34. An image forming method effected by an image forming apparatus including image forming means for forming an image on a recording medium, plain paper feeding means for feeding a plain paper to said image forming means as the recording medium, and exclusively usable paper feeding means for feeding an exclusively usable paper suitable for forming an image on said exclusively usable paper with said image forming means to the image forming means as the recording medium, said method comprising the steps of:
   selecting a recording medium to be used corresponding to a quality of the image to be formed on each recording medium;

feeding the recording medium to the image forming means corresponding to the selected kind of recording medium utilizing the plain paper feeding means or the exclusively usable feeding means;

forming the image on the recording medium; and detecting an image density of every predetermined unit area of an image to be formed, wherein said selecting step selects the recording medium based on the detection made in said detecting step.

35. The image forming method as claimed in claim 34, wherein a plurality of printing materials having different color tones are printed on the recording medium in said image forming step, and exclusively usable recording paper is selected when the plurality of printing materials are used.

36. The image forming method as claimed in claim 34, further comprising a step of determining whether the image to be formed includes a halftone image or not, wherein said selecting step selects the exclusively usable paper as the recording medium when determined in said image determining step that the halftone image is included, and selects the plain paper as the recording medium when the exclusively usable paper is not selected.

37. The image forming method as claimed in claim 35, further comprising a step of determining whether the image to be formed includes a halftone image or not, wherein said selecting step selects the exclusively usable paper as the recording medium when determined in said image determining step that the halftone image is included, and selects the plain paper as the recording medium when the exclusively usable paper is not selected.

38. The image forming method as claimed in claim 34, wherein when determined in said detecting step that a unit area having a density higher than the predetermined density is included in the image to be formed, said selecting step selects the exclusively usable paper as the recording medium, and when the exclusively usable paper is not selected, said selecting step selects the plain paper as the recording medium.

39. The image forming method as claimed in claim 37, further comprising a step of detecting an image density of every predetermined unit area of the image to be formed, wherein said selecting step selects a recording medium based on the detection made in said detecting step.

40. The image forming method as claimed in claim 39, wherein when determined in said detecting step that a unit area having a density higher than a predetermined density is included in the image to be formed, said selecting step selects the exclusively usable paper as the recording medium, and when the exclusively usable paper is not selected, said selecting step selects the plain paper as the recording medium.

41. The image forming method as claimed in claim 34, further including a manual selecting step of selecting the kind of recording medium in response to an input generated by manual actuation.

42. The image forming method as claimed in claim 34, wherein ink is utilized in said image forming step.

43. An image forming method as claimed in claim 42, wherein said image forming step utilizes as the image forming means an ink jet recording head adapted to form an image on the recording medium by ejecting the ink onto the recording medium.

44. The image forming method as claimed in claim 43, wherein said ink jet recording head includes thermal energy generating means for causing film boiling of the ink so as to generate an energy effective for ejecting the ink to the recording medium.

45. The image forming method as claimed in claim 34, wherein said image forming step utilizes as the image forming means electronic photographing type recording means.

46. An image forming apparatus comprising:

image forming means for forming an image on a recording medium;

a plurality of storing means for storing each of plural kinds of recording mediums;

conveying means for conveying each of the plural kinds of recording mediums stored in said plurality of storing means to said image forming means;

image determining means for determining the quality of the image to be formed on a recording medium, said image determining means determining whether each formed image contains a halftone image or not;

selecting means for selecting one of the plural kinds of recording mediums based on the determination made by said image determining means; and control means for causing said conveying means to convey the recording medium selected by said selecting means and causing said image forming means to form the image.

47. The image forming apparatus as claimed in claim 46, further comprising manual selecting means for selecting the kind of recording medium in response to an input generated by manual actuation.

48. The image forming apparatus as claimed in claim 46, wherein said image forming means utilizes ink.

49. The image forming apparatus as claimed in claim 48, wherein said image forming means comprises an ink jet recording head which forms an image on each recording medium by ejecting the ink onto the recording medium.

50. The image forming apparatus as claimed in claim 49, wherein said ink jet recording head comprises thermal energy generating means for causing film boiling of the ink so as to generate an energy effective for ejecting the ink to the recording medium.

51. The image forming apparatus as claimed in claim 46, wherein said image forming means uses a plurality of printing materials having different color tones to print on the recording medium and one of the plural kinds of recording mediums is suited for a printing operation to be performed using the plurality of printing materials.

52. The image forming apparatus as claimed in claim 46, wherein said selecting means selects the one of the plural kinds of recording mediums as the recording medium when said image determining means determines that the halftone is included in the image to be recorded, and selects plain paper as the recording medium when said image determining means determines that no halftone image is included in the image to be recorded.

53. An image forming apparatus comprising:

image forming means for forming an image on a recording medium in accordance with an image signal;

a plurality of storing means for storing each of plural kinds of recording mediums;

determination means for determining a type of an image to be formed in accordance with an image signal, said determination means determining whether each formed image contains a part having a density higher than a predetermined density or not;

selecting means for selecting one of the plural kinds of recording mediums based upon the determination made by said determination means; and control means for causing said image forming means to form the image on the selected kind of recording medium selected by said selecting means.

54. The image forming apparatus as claimed in claim 53, wherein said determination means determines whether each formed image contains a halftone image or not.

55. The image forming apparatus as claimed in claim 53, further comprising manual selecting means for selecting the kind of recording medium in response to an input generated by manual actuation.

56. The image forming apparatus as claimed in claim 53, wherein said image forming means utilizes ink.

57. The image forming apparatus as claimed in claim 56, wherein said image forming means comprises an ink jet recording head which forms an image on each recording medium by ejecting the ink onto the recording medium.

58. The image forming apparatus as claimed in claim 57, wherein said ink jet recording head comprises thermal energy generating means for causing film boiling of the ink so as to generate an energy effective for ejecting the ink to the recording medium.

59. The image forming apparatus as claimed in claim 53, wherein said image forming means uses a plurality of printing materials having different color tones to print on the recording medium and one of the plural kinds of recording mediums is suited for a printing operation to be performed using the plurality of printing materials.

60. The image forming apparatus as claimed in claim 53, wherein said determination means determines whether the image to be recorded includes a halftone image or not, wherein said selecting means selects the one of the plural kinds of recording mediums as the recording medium when said image determining means determines that the halftone is included in the image to be recorded, and selects plain paper as the recording medium when said image determining means determines that no halftone image is included in the image to be recorded.

61. An image forming method effected by an image forming apparatus including image forming means for forming an image on a recording medium in accordance with an image signal and a plurality of storing means for storing each of plural kinds of recording mediums, said method comprising the steps of:

determining a type of the image to be formed in accordance with an image signal by detecting an image density of every predetermined unit area of an image to be formed;

selecting one of the plural kinds of recording mediums in accordance with the type of the image to be formed determined in said determining step; and feeding the selected kind of recording medium to the image forming means to form the image thereon.

62. The image forming method as claimed in claim 61, further comprising an image forming step, wherein a plurality of printing materials having different color tones are printed on the recording medium in said image forming step, and one of the plural kinds of recording mediums is selected when the plurality of printing materials are used.

63. The image forming method as claimed in claim 61, further including a manual selecting step of selecting the kind of recording medium in response to an input generated by manual actuation.

64. The image forming method as claimed in claim 61, wherein when determined in said determining step that a unit area having a density higher than the predetermined density is included in the image to be formed, said selecting step selects one of the plural kinds of recording mediums as the recording medium.

65. The image forming method as claimed in claim 61, wherein said determining step comprises a step of detecting an image density of every predetermined unit area of the image to be formed, wherein said selecting step selects a recording medium based on the detection made in said detecting step.

66. An image forming method effected by an image forming apparatus including image forming means for forming an image on a recording medium in accordance with an image signal and a plurality of storing means for storing each of plural kinds of recording mediums, said method comprising the steps of:

determining a type of the image to be formed in accordance with an image signal by determining whether the image to be formed includes a halftone image or not;

selecting one of the plural kinds of recording mediums in accordance with the type of the image to be formed determined in said determining step, one of the plural kinds of recording mediums is selected as the recording medium when determined in said determining step that the halftone image is included; and feeding the selected kind of recording medium to the image forming means to form the image thereon.

67. The image forming method as claimed in claim 66, further comprising an image forming step, wherein a plurality of printing materials having different color tones are printed on the recording medium in said image forming step, and one of the plural kinds of recording mediums is selected when the plurality of printing materials are used.

68. The image forming method as claimed in claim 66, further including a manual selecting step of selecting the kind of recording medium in response to an input generated by manual actuation.

69. The image forming method as claimed in claim 66, wherein said determining step further comprises a step of detecting an image density of every predetermined unit area of the image to be formed, wherein said selecting step selects a recording medium based on the detection made in said detection step.

* * * * *

UNITED STATES PATENT AND TRADEMARK OFFICE
CERTIFICATE OF CORRECTION

PATENT NO. : 5,971,519

DATED : October 26, 1999

INVENTOR(S) : JUN HORIKOSHI

It is certified that error appears in the above - identified patent and that said letters Patent is hereby corrected as shown below:

SHEET 5 OF THE DRAWINGS:
  Figure 5, in Step S1, "INPUT RGE SIGNAL" should read --INPUT RGB SIGNAL--.

COLUMN 2:
  Line 10, "Anther" should read --Another--.

COLUMN 5:
  Line 12, "a" should be deleted.
  Line 47, "head, a" should read --head and a--.

COLUMN 6:
  Line 26, "pulse motors 25a and 25b" should read --pulse motors 24a and 24b--.
  Line 31, "mariner" should read --manner--.

COLUMN 7:
  Line 5, "a reader in" should read --or a reader, in--.
  Line 8, "once" should read --first--.

COLUMN 8:
  Line 1, "proceeds" should read --effects--.
  Line 2, "means.." should read --means.--.
  Line 15, "or" should read --of--.
  Line 26, "timer an" should read --time, and an--.

UNITED STATES PATENT AND TRADEMARK OFFICE
CERTIFICATE OF CORRECTION

PATENT NO. : 5,971,519

DATED : October 26, 1999

INVENTOR(S) : JUN HORIKOSHI

It is certified that error in the above - identified patent and that said letters Patent is hereby corrected as shown below:

COLUMN 11:
  Line 44, "once" should read --first--.

COLUMN 12:
  Line 47, "a" should be deleted.

COLUMN 13:
  Line 1, "be." should read --be--.
  Line 51, "discriminates" should read --discriminate--.

COLUMN 14:
  Line 59, "effect," should read --effects,--.

COLUMN 19:
  Line 3, "claim 7," should read --claim 17,--.
  Line 25, "step," should read --step--.

Signed and Sealed this

Twenty-sixth Day of December, 2000

Q. TODD DICKINSON

*Attest:*

*Attesting Officer*     *Director of Patents and Trademarks*